July 13, 1943.    H. LIEBERHERR    2,324,095
BEARING FOR TAKING AN AXIAL THRUST
Filed Sept. 30, 1941
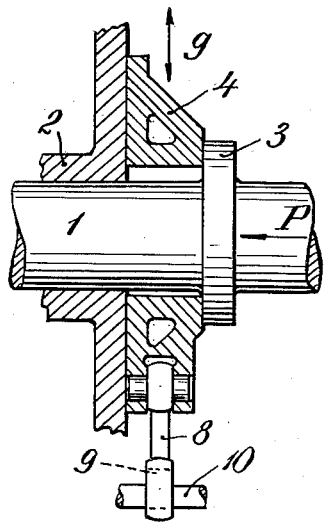
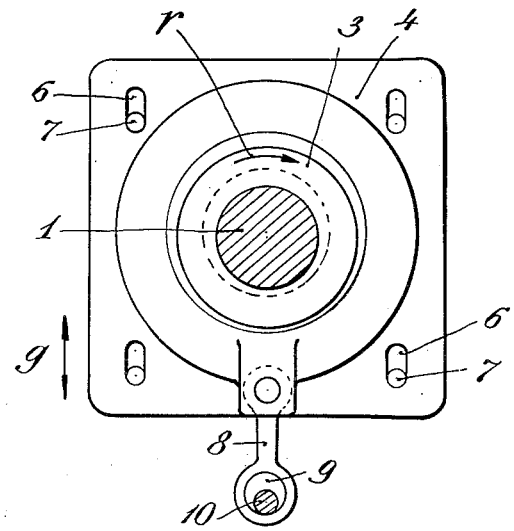
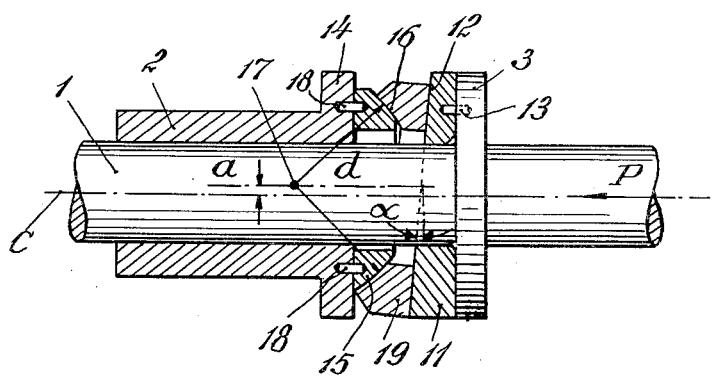
INVENTOR
Hans Lieberherr
BY
Pennie, Davis, Marvin Edmonds
ATTORNEYS Patented July 13, 1943

2,324,095

UNITED STATES PATENT OFFICE 2,324,095

BEARING FOR TAKING AXIAL THRUSTS

Hans Lieberherr, Winterthur, Switzerland, assignor to Sulzer Frères, Société Anonyme, Winterthur, Switzerland Application September 30, 1941, Serial No. 412,922
In Switzerland June 22, 1940

5 Claims. (Cl. 308—63)

The invention relates to a bearing for taking an axial thrust of a shaft and is characterised by a device which allows the relative motion caused by the rotation of the shaft and occurring between two surfaces facing each other for taking the axial thrust to be superposed with a component of motion directed transversely thereto. For instance between a running surface of the bearing and a running surface of the shaft an eccentrically floating intermediate ring taking the axial thrust may be introduced. The intermediate ring may be caused to turn by the friction at the running surface of the shaft. Preferably at least one running surface of the ring will be arranged eccentrically to the shaft. It is recommended to form this eccentrically arranged running surface as a spherical surface.

The invention is described below and some examples of execution are given diagrammatically in the drawing.

Figs. 1 and 2 show in cross-section and in front view one example of an execution according to the invention, and Fig. 3 illustrates a second example according to the invention.

Both examples according to the invention (Figs. 1-3) have a shaft 1 supported in a stationary bearing 2 which in addition to the radial forces has to take also an axial force P through the collar 3.

In the example illustrated in Figs. 1 and 2 the collar 3 runs on an intermediate piece 4 which can be reciprocated so that the relative motion $r$ caused by the rotation of the shaft and occurring between the collar 3 and the intermediate piece 4 taking the axial thrust can be supplemented by a component $g$ of motion directed transversely thereto. The intermediate piece is for this purpose guided by the pins 7 fitting in the slots 6 and is driven through a connecting rod 8 by an eccentric 9. The shaft 10 of the eccentric 9 is preferably driven at a speed which is not a low common multiple of the speed of shaft 1, so that a certain point of the collar 3 can only come into contact again with a certain point of the intermediate piece 4 after some length of time.

In the example illustrated in Fig. 3 the collar 3 has a facing ring 11, whose running surface 12 is inclined at an angle $\alpha$ to a normal to the axis $c$ of the shaft. By means of a pin 13 the facing ring 11 is carried round by the rotating shaft 1. On the thrust surface 14 of the bearing 2 a ball ring 15 with a spherical running surface 16 is arranged in such a way that the centre of curvature 17 of the spherical surface is displaced with respect to the axis $c$ of the shaft by a distance $a$. The ball ring 15 is kept in its position with respect to the bearing 2 by means of the pins 18. Floating freely between the facing ring 11 and the ball ring 15, an intermediate ring 19 is fitted which is supported by the inclined face 12 and the spherical surface 16, so that its axis is also outside the axis $c$ of the shaft.

The intermediate ring 19 cannot remain sticking either to the facing ring 11 or to the ball ring 15 while the shaft 1 is rotating. If it does not take any part in the rotation of the shaft 1, it would make a tipping motion round the centre of curvature 17 of the spherical surface, and corresponding to the inclination of the running face 12 with respect to a normal to the axis $c$ of the shaft. Therefore the relative motion between the inclined faces 12 caused by the rotation of the shaft will be supplemented by a component of motion directed transversely thereto. Also on the spherical running surfaces 16, in consequence of the inclination of the faces 12 with respect to a normal of the axis of the shaft, a small motion of radial displacement corresponding to the tipping motion will occur. If, however, the intermediate ring 19 were carried round by the shaft 1 at the same speed without any slip, the intermediate ring would make a rotation about the axis $d$ drawn through the centre of curvature 17 of the spherical surface. In consequence of the displacement of the axis $d$ of the spherical surface 16 with respect to the axis $c$ of the shaft 1 the relative motions caused by the rotation of the shaft and occurring between the spherical surfaces 16 would be supplemented by a tipping motion directed transversely thereto. At the same time also there would be a small motion of displacement of the running faces 12 with respect to each other, which motion corresponds to the displacement $a$ of the two axes $c$ and $d$.

The described limiting cases of the motion, in which the intermediate ring is either not carried round by the shaft 1 at all or is completely carried round without slip by the shaft 1, will scarcely ever be able to occur in practice. More probably a state of motion will arise in which the intermediate ring 19 will be carried round by the shaft 1 with more or less slip. Both at the inclined running faces 12 and at the spherical running faces 16 a relative motion will take place in consequence of the rotation of the shaft and this motion will be supplemented by a component of motion directed transversely thereto. A certain point on one of the running surfaces could therefore not come into contact again with a certain other point on the running surface supporting it until after some length of time.

I claim:

1. Apparatus for taking the axial thrust of a shaft which comprises a bearing in which the shaft is rotatable, means on the shaft providing a running surface inclined from a plane at right angles to the axis of the shaft, a spherical running surface on the bearing having its center of curvature displaced with respect to the shaft axis, and an intermediate member having a running surface in contact with the inclined running surface and a spherical running surface in contact with the spherical surface on the bearing.

2. Apparatus for taking the axial thrust of a shaft which comprises a bearing in which the shaft is rotatable, a running surface on the bearing, a collar on the shaft having a running surface, an intermediate member between and in contact with the said surfaces which is eccentrically disposed with respect to the shaft axis, and means causing the said intermediate member to have a component of motion transverse to the axis of the shaft when the shaft is rotating.

3. Apparatus as claimed in claim 2, characterized by the fact that the intermediate member is a floating ring taking the axial thrust introduced between the running surface on the bearing and the running surface on the collar.

4. Apparatus as claimed in claim 2, characterized by the fact that the intermediate member is a ring caused to turn by the friction at the running surface on the collar and that at least one running surface of the intermediate member is arranged eccentrically to the shaft.

5. Apparatus for taking the axial thrust of a shaft which comprises a bearing in which the shaft is rotatable, a running surface on the bearing, a collar on the shaft having a running surface, an intermediate member between and in contact with the said surfaces and means causing the said intermediate member to have a component of motion transverse to the axis of the shaft when the shaft is rotating.

HANS LIEBERHERR.